Jan. 20, 1931.   F. E. DAVIS   1,789,426
SPRING SUSPENSION
Filed May 14, 1928
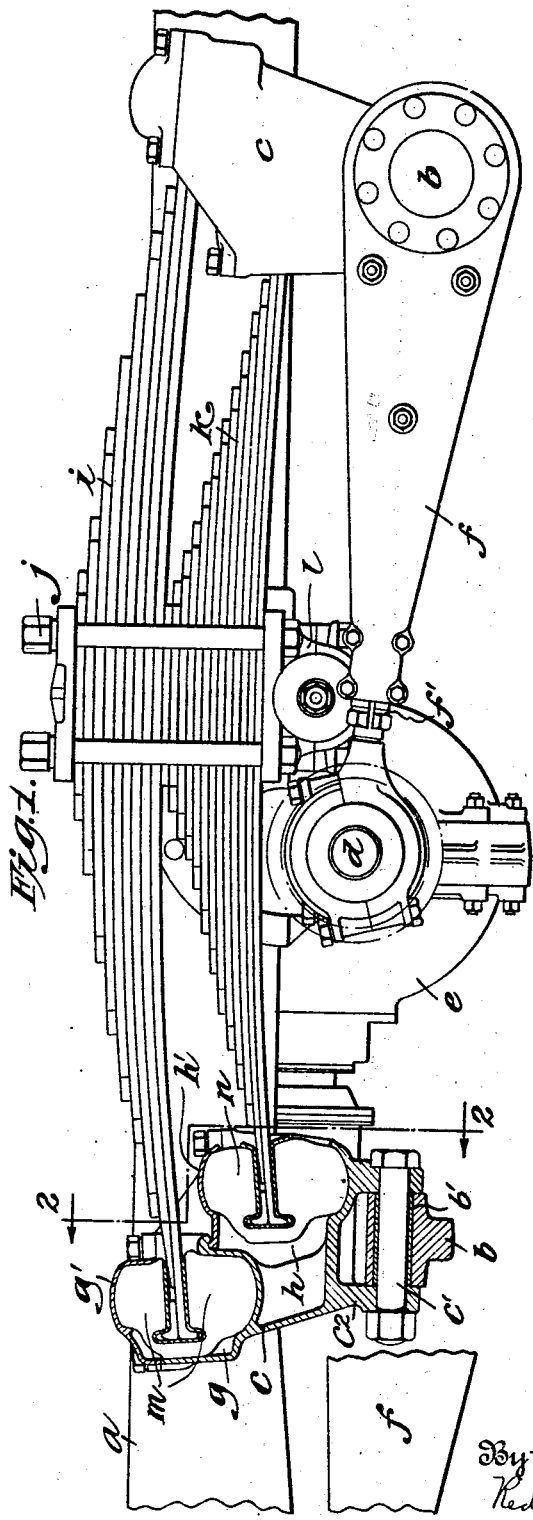
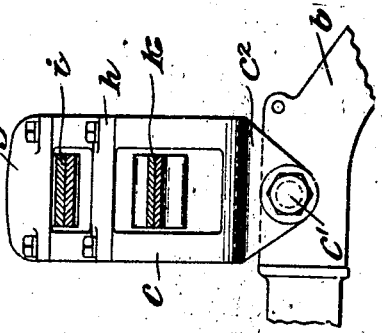
Inventor:
Floyd Edson Davis
By his Attorneys
Redding, Greeley, O'Shea & Campbell Patented Jan. 20, 1931

1,789,426

UNITED STATES PATENT OFFICE

FLOYD EDSON DAVIS, OF NEW YORK, N. Y., ASSIGNOR TO INTERNATIONAL MOTOR COMPANY, OF NEW YORK, N. Y., A CORPORATION OF DELAWARE

SPRING SUSPENSION

Application filed May 14, 1928. Serial No. 277,504.

The present invention relates to spring suspensions for vehicles of the type having four rear driving wheels. Where the vehicle is of a type requiring this arrangement of driving wheels, the size thereof is usually such as to necessitate the provision of springs of considerable size. As the size of the springs increases, the inflexibility of the driving truck, or the mounting of the wheels upon the frame, correspondingly increases and it has been found that this factor places a distinct limitation upon the design of these elements.

This invention relates to a spring suspension for vehicles of the above type, wherein complete flexibility between the individual wheels and between the wheels and frame is provided. The leaf spring of existing designs, having a great number of leaves, and being of a considerable depth, is replaced by a spring having two series of load arms. The two series are secured rigidly together at their mid-sections and at this point, are pivoted or secured to the frame in a suitable manner. The ends of each spring are mounted independently to the respective axles in such manner that relative elongation of one spring with respect to the other is accommodated as well as the relative movement of the elements by reason of tipping of the axle.

As a further feature of the invention, the spring ends are mounted independently at a given point in a housing which is pivoted to the axle. This pivoting permits tilting of the axle without displacing the housing from its normal vertical plane and the yielding non-metallic material carried within the housing permits a slight transverse movement of the housing with respect to the spring to accommodate the slight shifting of the plane of the housing due to such pivotal movement of the axle.

Further objects and advantages will appear as the invention is described in greater detail in connection with the accompanying drawings, wherein:

Figure 1 is a view in side elevation, partly in section, showing a spring construction in accordance with the present invention.

Figure 2 is a view in section, taken on line 2—2 of Figure 1, and looking in the direction of the arrows.

Referring to the above figures, $a$ indicates a vehicle frame provided with forward and rearward rear axles $b$. In the form of drive in which the present invention is embodied, these are dead axles, the drive being effected through jack shafts $d$ carried upon the vehicle frame and receiving power from differentials $e$. Radius rods $f$ space the axles $b$ from the jack shafts $d$ and are adjustable as at $f'$.

Passing through each axle $b$ at either side thereof, are bushed apertures $b'$ for receiving bolts $c'$ carried by a yoke-shaped projection $c^2$ of housing $c$. Bolt $c'$ permits pivotal movement of the housing $c$ with respect to the axle in the plane of the axle. Each housing $c$ is provided with separate compartments $g$ and $h$. The upper compartment $g$ is closed by a cap $g'$ and the lower compartment by cap $h'$.

The spring is formed of upper and lower sections $i$ and $k$, respectively, secured together by bolts $j$ and pivoted to the frame by bracket $l$. The ends of the upper section $i$ are received within the compartment $g$ and carried by blocks of yielding non-metallic material $m$. The construction of the compartments $g$ and blocks $m$ is such that the ends of the spring section $i$ will be relatively fixed with respect to the housing $c$, although the shocks and vibrations received by one will not be transmitted to the other. The ends of the lower section $k$ are received in blocks of yielding non-metallic material $n$ in the compartments $h$, the construction of these elements being such that a degree of movement between the ends of the spring $k$ and the housings $c$ is permitted. This shackle connection permits the ends of the springs to function independently in carrying the load of the vehicle, thus permitting the axles to ride freely upon the roadbed.

As the axle rises, the end of spring $i$ is relatively fixed while that of spring $k$ moves into the compartment $h$. The difference in length between the spring sections gives a snubbing action between the axle and frame. In designing the springs, care is taken to have the sections thereof of the same flexibility in order that all of the units of non-metallic yielding material may carry the same load and have the same pressure exerted thereon. By dividing the rubber commonly used to receive the spring ends into two portions, as described herein, a more efficient and practical construction results, since the size of the individual parts is not rendered excessively large.

While the invention has been described in connection with the specific construction shown in the accompanying drawings, it is not to be limited save as defined in the appended claims.

I claim as my invention:

1. In combination with a vehicle frame and a pair of axles, a suspension for the frame comprising a plurality of independent load-carrying spring sections, means to mount the sections as a unit upon the frame, a housing carried by each axle, compartments in the housings, and yielding non-metallic material in the compartments for connecting the respective spring ends to the axles.

2. In combination with a vehicle frame and a pair of axles, a suspension for the frame comprising a plurality of independent load-carrying spring sections, means to mount the sections as a unit upon the frame, housings carried by the axles, upper and lower compartments in the housings for receiving the ends of the respective spring sections, non-metallic yielding material in the upper compartments to hold the ends of the upper spring relatively fixed with respect to the housings, and yielding non-metallic material in the lower compartments to receive the ends of the lower spring, the last named yielding material permitting relative movement of the ends of the lower spring section with respect to the housing.

3. In combination with a vehicle frame and a pair of axles, a suspension for the frame comprising a plurality of independent load-carrying spring sections, said sections being spaced one above the other, and one of the sections being longer than the other, a housing carried by each axle, and yielding non-metallic material carried by the housings to connect the ends of the springs to the axles.

4. In combination with a vehicle frame and a pair of axles, a suspension for the frame comprising a plurality of independent load-carrying spring sections, said sections being spaced one above the other, and one of the sections being longer than the other, a housing carried by each axle, yielding non-metallic material carried by the housings to engage the ends of the longer spring section fixedly with respect to the housings, and yielding non-metallic material carried by the housings to engage the ends of the shorter spring to permit relative movement between such spring and the housings.

5. In combination with a vehicle frame and a pair of axles, a suspension for the frame comprising a plurality of independent load-carrying spring sections, means to mount the sections as a unit upon the frame, a housing carried by each axle, yielding non-metallic means carried by the housings to connect the springs to the axles, and means to mount the housings pivotally to the axles.

6. In combination with a vehicle frame and a pair of axles, a suspension for the frame comprising a plurality of independent load-carrying spring sections, means to mount the sections as a unit upon the frame, means to connect the ends of the springs to the axles, and means to mount the last named means pivotally upon the axles to swing upon an axis parallel to that of the spring.

This specification signed this 10th day of May, A. D. 1928.

FLOYD EDSON DAVIS.